Patented Apr. 13, 1937

2,076,707

UNITED STATES PATENT OFFICE 2,076,707

ARYL-PHENYL CINCHONINATES AND THE PREPARATION THEREOF

Walter G. Christiansen, Glen Ridge, N. J., and Sidney E. Harris, Lynbrook, N. Y., assignors to E. R. Squibb & Sons, New York, N. Y., a corporation of New York No Drawing. Application March 18, 1932, Serial No. 599,843

10 Claims. (Cl. 260—39)

This invention relates to, and has for its object the provision of, the compounds of the group consisting of the nitroaryl and the aminoaryl esters of phenylcinchoninic acid and advantageous methods of preparing them.

In the practice of this invention, nitroaryl phenylcinchoninates are prepared by converting phenylcinchoninic acid into the acyl halide and substituting a nitroaryloxy group for the halogen; and aminoaryl phenylcinchoninates are prepared by reducing the nitro group of nitroaryl phenylcinchoninates to an amino group. Preferably, the phenylcinchoninic acid is converted into the acyl chloride by means of phosphorus oxychloride, the nitroaryloxy group is substituted for the chlorine by means of a nitrophenol, and the nitro group is reduced to an amino group by means of hydrogen and platinum oxide catalyst or by means of ferrous sulfate and ammonium hydroxide.

As an example of the preparation of a nitroaryl phenylcinchoninate, a suspension of 20 g. of phenylcinchoninic acid and 11.2 g. of p-nitrophenol in 500 cc. of benzol is heated to boiling while mechanically agitated; 6.2 g. of phosphorus oxychloride is added; the solution is refluxed about five hours, until hydrochloric acid ceases to be evolved; the benzol is distilled off; the residue is treated several times with boiling water to remove p-nitrophenol and acid and then with a dilute solution of sodium bicarbonate to dissolve any unchanged phenylcinchoninic acid; and the mass is washed with water until the washings become colorless, dried, and purified by precipitation from chloroform by means of absolute alcohol. The p-nitrophenyl ester of phenylcinchoninic acid

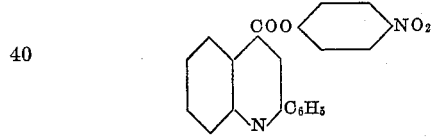

so obtained is a faintly yellow powder melting at between 155.5° and 156° C.

As an example of the preparation of an aminoaryl phenylcinchoninate, either of the following processes may be pursued: (a) A suspension of 2 g. of p-nitrophenyl phenylcinchoninate and .1 g. of platinum oxide catalyst (Adams and Shriner, Organic Synthesis, vol. 8, p. 92) in 100 cc. of glacial acetic acid is shaken for an hour with hydrogen at a pressure of two atmospheres. On filtering off the catalyst and adding 500 cc. of water, there is obtained a yellow emulsion from which, by scratching the vessel with a glass rod and stirring vigorously, minute yellow crystals may be caused to deposit. (b) A suspension of 2 g. of p-nitrophenyl phenylcinchoninate in 250 cc. of water containing 50 g. of ferrous sulfate is heated to boiling; a slight excess of ammonium hydroxide is added; ebullition is continued for six hours and is followed by filtration and washing; and the dried filter cake is repeatedly extracted with boiling absolute alcohol. Yellow crystals are deposited by the extracts when cool.

On recrystallization from alcohol, the p-aminophenyl ester of phenylcinchoninic acid

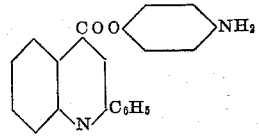

melts at between 195° and 196° C.

It is to be understood that the foregoing embodiment is merely illustrative and not limitative of the invention, which may assume various other forms—for instance, as to the particular aryls introduced and the reactants, proportions, and procedures employed—within the scope of the appended claims.

We claim.

1. Compounds of the class consisting of nitroaryl alphaphenylcinchoninates and aminoaryl alphaphenylcinchoninates, where the aryl is of the benzene series.

2. Compounds having the general formula

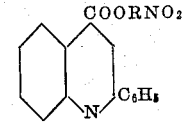

wherein R represents an aryl of the benzene series.

3. Compounds having the general formula

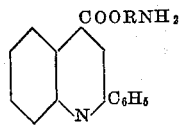

wherein R represents an aryl of the benezene series.

4. The compound nitrophenyl alphaphenylcinchoninate.

5. The compound aminophenyl alphaphenylcinchoninate.

6. The compound p-nitrophenyl alphaphenylcinchoninate.

7. The compound p-aminophenyl alphaphenylcinchoninate.

8. A method of preparing compounds having the general formula

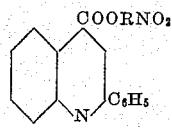

wherein R represents an aryl of the benzene series, that comprises treating alphaphenylcinchoninic acid with HORNO2, wherein R represents an aryl of the benzene series, and adding phosphorus oxychloride while heating.

9. A method of preparing nitrophenyl alphaphenylcinchoninate that comprises treating alphaphenylcinchoninic acid with nitrophenol, and adding phosphorus oxychloride while heating.

10. A method of preparing aminophenyl alphaphenylcinchoninate that comprises treating nitrophenyl alphaphenylcinchoninate with ferrous sulfate and ammonium hydroxide, with heat.

WALTER G. CHRISTIANSEN.
SIDNEY E. HARRIS.